United States Patent [19]
MacAfee

[11] Patent Number: 4,535,970
[45] Date of Patent: Aug. 20, 1985

[54] TOP ENTRY BALL VALVE
[75] Inventor: Jerry D. MacAfee, Glastonbury, Conn.
[73] Assignee: Quamco, Inc., East Hartford, Conn.
[21] Appl. No.: 565,290
[22] Filed: Dec. 27, 1983
[51] Int. Cl.³ .............................................. F16K 43/00
[52] U.S. Cl. ....................................... 251/315; 251/316
[58] Field of Search ................ 251/314, 315, 316, 192
[56] References Cited
U.S. PATENT DOCUMENTS

| 709,146 | 9/1902 | Erdman | 251/192 |
|---|---|---|---|
| 3,284,046 | 11/1966 | Allenbaugh Jr. | 251/315 |
| 3,648,723 | 3/1972 | Nelson et al. | 251/316 |
| 3,838,844 | 10/1974 | Arn | 251/315 |
| 4,342,330 | 8/1982 | Wieveg et al. | 251/315 |
| 4,478,388 | 10/1984 | George | 251/314 |

Primary Examiner—Martin P. Schwadron
Assistant Examiner—Sheri Novack
Attorney, Agent, or Firm—Spencer T. Smith

[57] ABSTRACT

A top entry ball valve comprises a plug element having two curved sides and two inclined flat sides which contain the ball and two seats. A pair of cheek elements each having one curved side and one inclined flat side are disposed on either side of the plug element with the inclined flat side of each cheek element in contact with the inclined flat sides of the plug element. The valve body includes a cylindrical bore which is dimensioned to receive the plug element and the cheek elements, and which has an axis which is perpendicular to the axis of the inlet and outlet ports of the valve. The plug element is biased into the cylindrical bore, whereby the inclined sides of the plug element act against the inclined sides of the cheek elements to produce an axial force on the seats and the ball to form a leak-proof valve assembly.

3 Claims, 3 Drawing Figures

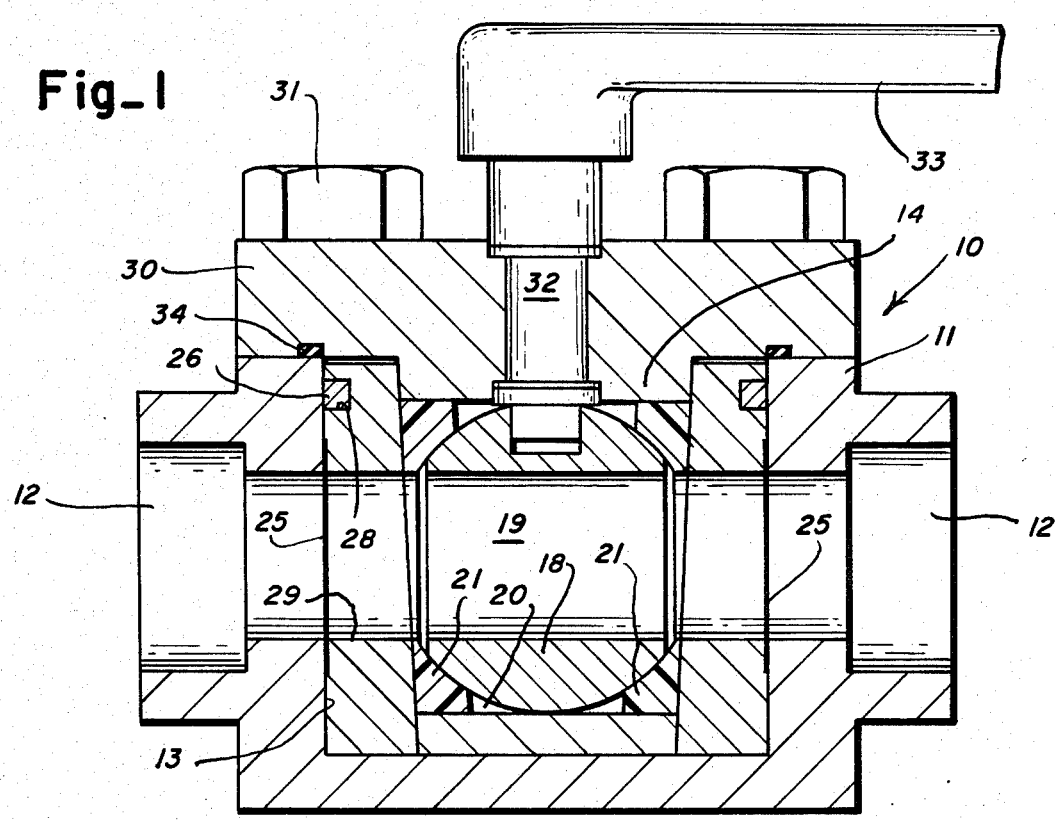
Fig_1
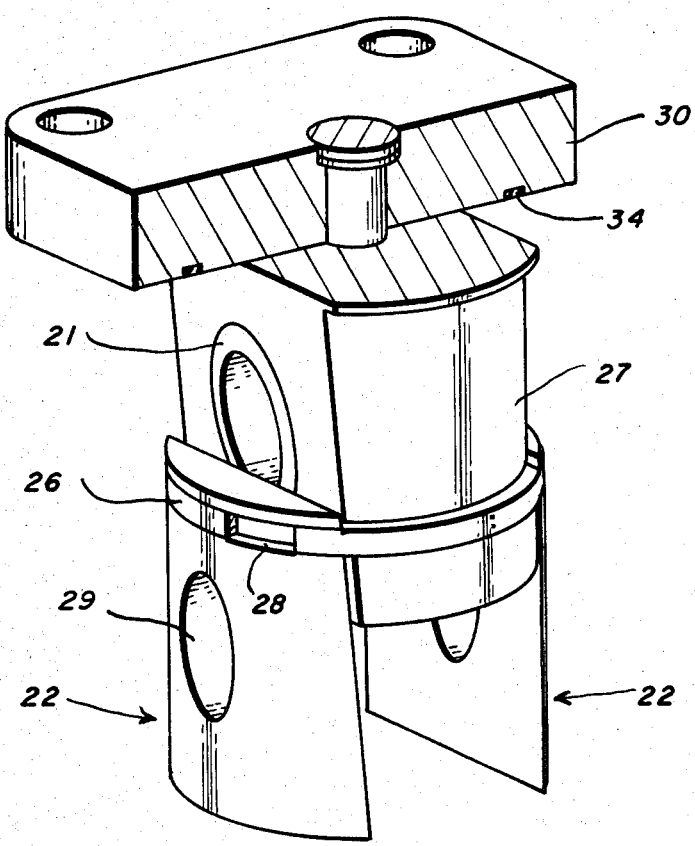
Fig_3

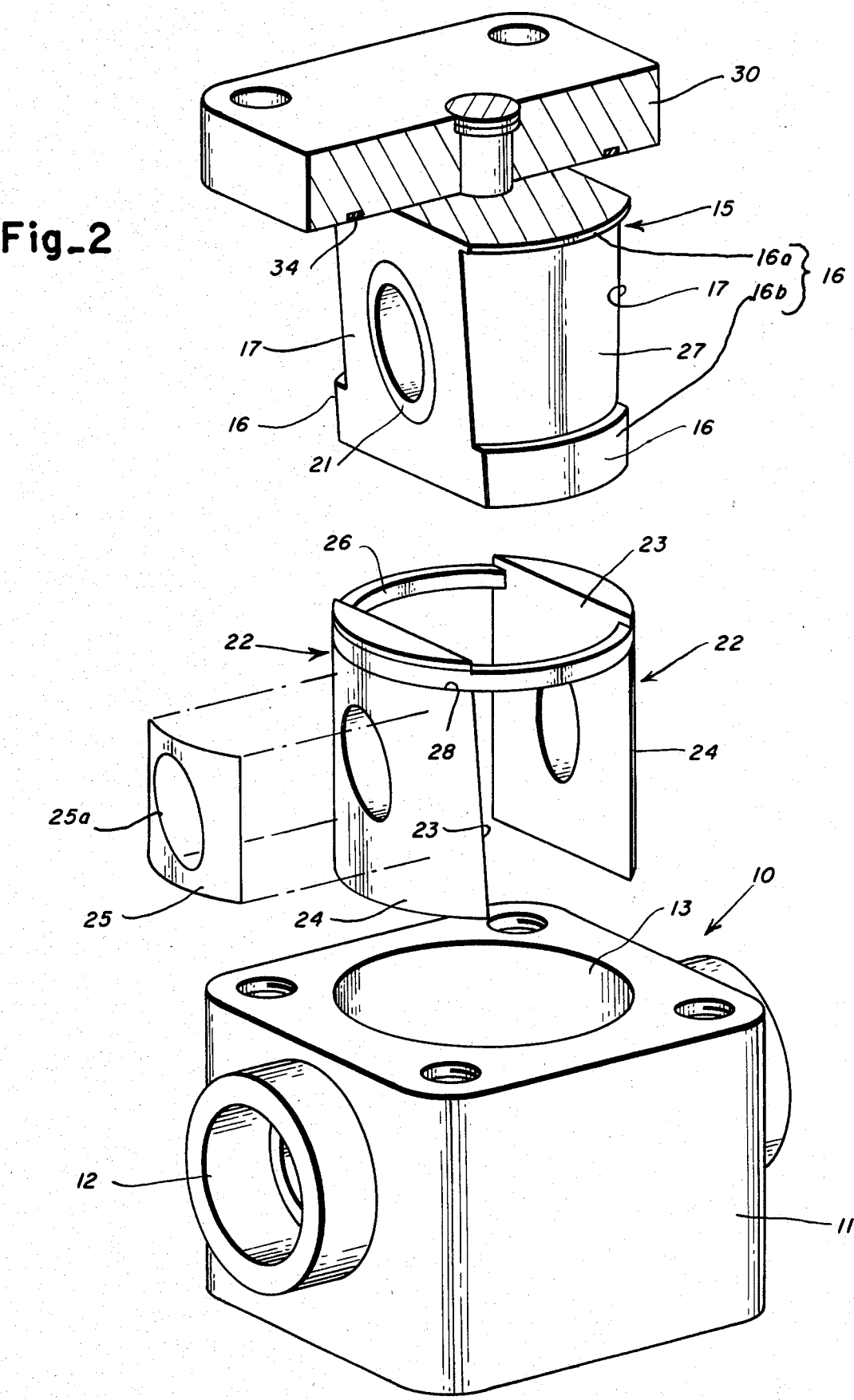
Fig_2

TOP ENTRY BALL VALVE

BACKGROUND OF THE INVENTION

The invention relates to a top entry ball valve. Top entry ball valves are well known in the art. Such valves are constructed to allow removal and replacement of the valve element without removing the valve body from the pipeline in which the valve is installed. Since top entry ball valves do not have bolts which hold the end caps of the valve together and which apply a compressive force to the valve seats to create a leak-proof valve, wedge-shaped elements located on either side of the ball which are in contact with the valve seats are utilized to provide the necessary compression. Such a construction is shown in U.S. Pat. No. 3,838,844. The interior surface of the valve casing against which the wedge-shaped element bears is a flat machined surface formed by an expensive manufacturing technique referred to as back spot facing. Back spot facing requires that a tool be inserted into a valve casing from one of the valve inlets and thereafter expanded and backed up in order to perform the facing operation. Two such faces must be formed in each valve and since these faces should be parallel within a few thousandths tolerance, the back spot facing operation requires precision tooling and a substantial amount of time to perform properly. Such expensive machining and time-consuming techniques result in a valve which is costly and difficult to manufacture. It would, therefore, be advantageous to provide a top entry ball valve which does not require internal parallel flat surfaces formed by a back spot facing operation.

SUMMARY AND OBJECTS OF THE INVENTION

It is, therefore, an object of the invention to provide a top entry ball valve having components which are simple and economical to produce.

These and other objects of the invention will become apparent from the following detailed description taken in conjunction with the accompanying drawing figures in which like reference numerals used throughout the description designate like or corresponding parts in the figures.

BRIEF DESCRIPTION OF THE DRAWINGS

FIG. 1 is a sectional view of a top entry ball valve according to the invention.

FIG. 2 is an exploded view partly in section of the ball valve of FIG. 1.

FIG. 3 shows three elements of the top entry ball valve of FIGS. 1 and 2 retained together by a keeper ring.

DESCRIPTION OF THE PREFERRED EMBODIMENT

Turning now to FIGS. 1 and 2, there is shown a top entry ball valve generally designated by the reference numeral 10. The valve includes a lower valve casing or body 11 having opposed ports 12 for passage of fluid through the valve along a horizontal axis. The ports 12 communicate with a valve chamber 13 which comprises a cylindrical bore which extends downwardly from the top surface of the valve body 11. The vertical axis of this bore is perpendicular to the axis defined by the ports 12.

The cylindrical bore 13 is dimensioned to receive the lower portion of the upper casing 14 (FIG. 2) which has the form of a plug 15 having two cylindrical vertical sides 16 and two substantially vertical inclined flat sides 17 which are inclined inwardly from top to bottom. The plug 15 is integral with and extends downwardly from the cap portion 30 of the upper casing portion and has a horizontal bore 20 which is aligned with the ports 12 of the valve body and which ball 18 having a flow passage 19 therethrough and a pair of annular valve seats 21 which surround the ports of the ball when the valve is in the open position illustrated in FIG. 1.

A pair of cheek elements 22 are disposed in the cylindrical bore 13 on either side of the plug 15 and comprise an flat side 23 which is inclined toward the plug from the top to the bottom thereof; and a cylindrical side 24. The inclined flat side 23 of the cheek elements matingly engaged with the inclined flat sides 17 of the plug 15 and the cylindrical side 24 of the cheek elements is dimensioned to matingly engage with the vertical wall of the cylindrical bore 13. The cheek elements have a bore 29 therein which communicates with the inlet and outlet passages 12 and the plug bore 20. A thin sheet of gasket material 25 such as expanded graphite foil sold under the tradename "Grafoil" having a central hole 25a is positioned between the cylindrical sides 24 and the vertical wall of the cylindrical bore 13 to permit flow through the valve and to insure a leak-proof fit or seal between a cheek element 22 and the valve body 11 around each port. A relief portion 27 is formed in the cylindrical sides 16 of the plug and extends from a top annular band 16a downwardly to an annular band 16b. A keeper ring 26 rides in the relief portion 27 and is also positioned in an annular horizontal groove 28 formed in the cylindrical side 24 of the cheek elements 22.

The cylindrical bore 13 is closed by the portion cap 30 of the upper casing 14 which sits on the body 11 of the valve and is held in place by a plurality of bolts 31. The cap portion supports a valve stem 32, one end of which is engaged with the ball 18 and the other end of which is operatively attached to a handle 33. An O-ring seal 34 contained within the cap provides a fluid seal between the cap 30 and the body 11. The bore 13 which forms the valve chamber may be readily and easily formed in the valve body by a boring operation to very exact tolerances. The cap element 14 and the cheek elements 22 may also be readily formed by standard techniques, resulting in a top entry valve which is simple and economical to produce.

MODE OF OPERATION OF THE PREFERRED EMBODIMENT

The valve is operated by selectively turning the handle 33 to rotate between open and closed position. When it is desired to inspect or replace the valve seats 21, the bolts 32 may be loosened and the cap portion 14 can be gripped and raised. As the cap is raised, the keeper ring which is located near the top of the plug relief portion 27 and is retained within cheek grooves 28 will remain stationary and will therefore slide down the relief portion 27 until the keeper 27 reaches the bottom of the relief and strikes the bottom annular portion of the cylindrical surface of the plug. At this time, however, the vertical movement of the cap 14 relative to the stationary cheek elements has generated a clearance between the cheek elements and the plug portion. Further lifting thereby quickly frees the cheek elements from the casing and raises the keeper and the cheek elements 22. The keeper ring 26 maintains the plug 15 and the two cheek pieces 22 in a unitary relationship.

After the seats have been serviced, the plug and cheek assembly may be inserted back into the cylindrical bore. The bolts 31 will secure the cap 30 to the valve body 11 and the biasing force provide by the bolts 31 forces the plug 15 downwardly into the cylindrical bore 13 and against the inclined sides 23 of the cheek elements 22 compressing the gaskets 25 between the cheek elements 22 and the casing or body 11. The compressed gasket 25 provides a seal between the downstream cheek element 22 and the casing or body port 12. The seat 21 provides the required seal between the ball and the downstream cheek element and the O-ring seal 34 provides a seal between the cap 30 and the valve body 11.

Having thus described the invention, various alterations and modifications thereof will occur to those skilled in the art, which modifications and alterations are intended to be within the scope of the invention as defined by the appended claims.

What is claimed is:

1. A top entry ball valve comprising:
   a first casing portion having a cylindrical bore extending downwardly from the top surface thereof and inlet and outlet passages extending horizontally therethrough and communicating with said vertical bore,
   a second casing portion including
      an upper cap portion having a bottom annular surface for matingly engaging with the top surface of said first casing portion and a downwardly projecting lower plug portion having
      a pair or opposed vertical cylindrical surface means adapted to matingly engage with the surface defined by said downwardly extending bore in the first casing portion, and
      a pair of opposed flat surfaces joining said opposed cylindrical surfaces and inclined inwardly downwardly towards each other, said flat surfaces extending substantially perpendicularly to said inlet and outlet passages,
      a bore extending horizontally through said plug portion between said flat surfaces,
   a ball having a bore therthrough and a pair of annular seats one either side of said ball located within said horizontal bore,
   a pair of cheek elements each having one vertical cylindrical surface for matingly engaging with the surface defined by said downwardly extending bore in the first casing portion and a flat surface inclined inwardly downwardly for mating engagement with an inclined surface of said second casing portion, each of said cheek elements having a horizontal bore therethrough communicating with the flat surface thereof, and said inlet and outlet passages of said lower casing portion, the horizontal bore in each of said cheek elements and the horizontal bore in said plug portion being axially aligned.

2. A top entry ball valve according to claim 1, wherein said vertical cylindrical surface means of said plug portion comprises an annular surface proximate the top thereof, an annular surface proximate the bottom thereof, and an annular relief area extending between said top and bottom annular surfaces further comprising:
   an annular horizontal groove defined in the top portion of each of said cheek elements,
   a keeper ring extending within said annular grooves of said cheek elements and extending within said annular relief area of said plug portion.

3. A top entry ball valve according to claim 2 further comprising a pair of flat gaskets each having a central hole therein, said gaskets located between each of said cheek elements and said cylindrical surface of said lower casing.

* * * * *